INVENTORS
WILLIAM D. LOVE, JR.
MARCUS J. BILLINGS
BY
Sheldon F. Raizes
ATTORNEY

United States Patent Office 3,389,923
Patented June 25, 1968

3,389,923
JOINT CONNECTION
William D. Love, Jr., Lafayette, and Marcus J. Billings, El Cerrito, Calif., assignors to Haveg Industries, Inc., Wilmington, Del., a corporation of Delaware
Continuation-in-part of application Ser. No. 465,607, June 21, 1965. This application Nov. 8, 1967, Ser. No. 681,315
8 Claims. (Cl. 285—321)

ABSTRACT OF THE DISCLOSURE

A connection between two telescoping pipes wherein a resilient split ring has portions engaging opposing shoulders of a recess on one pipe for retaining the ring on the one pipe while the inner pipe is being inserted within the outer pipe; the split ring has additional portions engaging a shoulder of a recess on the other pipe after the insertion of the inner pipe for preventing the inner pipe from being withdrawn from the outer pipe.

---

This application is a continuation-in-part of our copending U.S. appln. Ser. No. 465,607, filed June 21, 1965 and now abandoned.

The invention relates generally to pipe couplings, and more particularly to coupling means for joining together the ends of sections of plastic pipe.

Tubular conduit having a relatively rigid structure is utilized for numerous functions which include carrying liquids, ducting gases, enclosing electrical cables for underground burial, etc. One of the most promising materials for use for such conduit is thermo-plastic material which has in recent years enjoyed a large growth in production and is obtainable at reasonable cost. Outstanding in the latter group of materials are the polyolefins, which among other advantages, provide, a very smooth waxy surface and are inert and non-reactive to most chemicals and other materials which may contact the internal surface of the conduits. This non-reactive property of the polyolefins group of the plastics, precludes the possibility of securing the pipe sections together with a solid or cement adhesive. They may be fused together by heat but this is not practical.

Plastics of the polyolefin group have a relatively high coefficient of heat expansion. Where the conduit is subjected to a large drop in temperature the ensuing contraction may be sufficient to pull the joint apart. Accordingly, one of the main objects of the present invention is to provide a joint for coupling thermoplastic pipe particularly of the polyolefin group which will hold firm up to near the full strength of the material itself, so that the material in the conduit will elongate rather than pull out of the joint.

Another object of the present invention is to provide a connector of the character described which enables an easy, rapid and positive assembly of length of plastic pipe.

A further object of the present invention is to provide a pipe connector of the character above, in which the positive locking of the pipe sections together is accomplished without weakening or tending to destroy the pipe sections or connected portions thereof.

The invention possesses other objects and features of advantage, some of which of the foregoing will be set forth in the following description or the preferred form of the invention which is illustrated in the drawing accompanying and forming part of this specification. It is to be understood, however, that variations in the showing made by the said drawing and description may be adapted within the scope of the invention as set forth in the claims.

Referring to said drawing:
FIGURE 1 is a side view partially in cross section of two pipe sections and a receiving coupler with two split ring connectors constructed in accordance with the present invention and shown with one pipe section inserted and in locked position.

Figure 1:
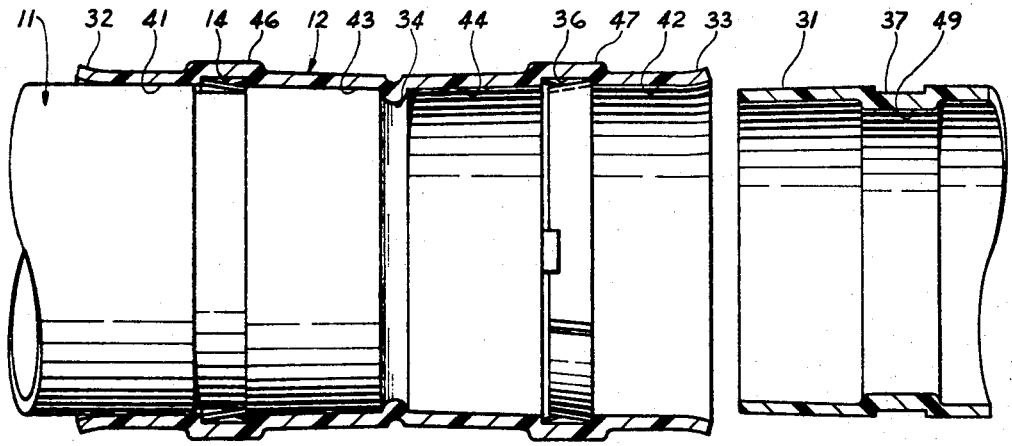
Figure 2:
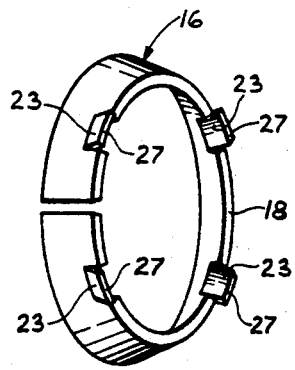
FIGURE 2 is a perspective view of a split ring connector shown in FIGURE 1.

The pipe joint of the present invention comprises, briefly, a pair of telescopically engaged pipe and coupler members 11 and 12 having registering external and internal annular recesses 13 and 14 respectively. A frusto-conical resilient member 16 mounted in the registering recesses and having large and small diameter ends 17 and 18 disposed for engagement with diagonally opposed end walls or shoulders 21 and 22 of recesses 13 and 14, and a plurality of circumferentially spaced radially resilient tabs projecting exteriorly from a mid portion of member 16 in the direction of its smaller diameter end 18 and disposed for engagement with end wall or shoulders 24 of recess 14.

Figure 3:
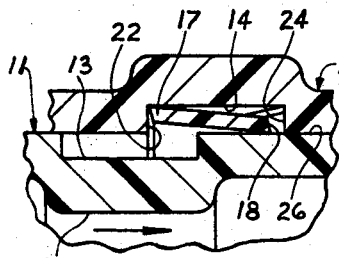
FIGURE 3 is an enlarged fragmentary cross-sectional view of the corresponding annular recesses in the coupler and pipe section shown in FIGURE 1 with the pipe section partially inserted.
Figure 4:
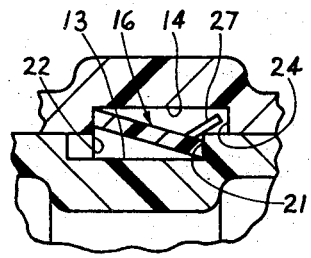
FIGURE 4 is an enlarged partially cross-sectional view of the corresponding annular recesses in the coupler and pipe section of FIGURE 1 with the pipe section fully inserted.

In the foregoing construction it will be noted that shoulder 22 faces in the direction of telescopic insertion of pipe 11 into coupler 12, see FIGURE 3, while shoulders 21 and 24 face in the opposite direction, that is, opposed to the direction of telescopic connection of the pipe member 11. It will also be noted that the ring member 16 is of segmental shape and is of spring material and has a circumferential dimension greater than a semi-circle but less than 360° so as to be self-retaining when mounted in the outer recess 14 in the coupler member. The foregoing construction cooperating with the resilient flexing of tabs 23 permit telescopic insertion of pipe section 11 as seen in FIGURE 3 during the course of which the frusto-conical member is flattened and pressed up into recess 14 by the action of the exterior side 26 of the pipe, and the member 16 automatically springs back into its unstressed form when the pipe section is inserted sufficiently to move recess 13 into registration with recess 14 as seen in FIGURE 4. In this position of the members, the abutment of the opposite ends 17 and 18 of the spring member 16 with the diagonally opposed shoulders 21 and 22 prevent telescopic disconnection of the members. At the same time, the ends of tabs 23 remain juxtaposed to shoulder 24 to limit the telescopic insertion of the pipe.

Preferably the tabs 23 are formed out of the material of member 16 and the outer ends 27 of the tabs lie on a circle substantially concentric to the large and small diameter ends 17 and 18, and having a diameter substantially equal to the large diameter end. Thus the tab ends 27 and member end 17 will be disposed for engagement with the opposite end shoulders 23 and 24 of recess 14. This arrangement prevents the split ring from being urged out of recess 14 to become wedged between the coupler and pipe on insertion of the pipe as illustrated in FIGURE 3. The small diameter end 18 is formed with a diameter smaller than the external diameter of the pipe 11 so as to be automatically resiliently distended upon insertion of the pipe and movement of recesses 13 and 14 into registration. Preferably the free ends 27 of the tabs extend axially beyond the small diameter end 18 of the frusto-conical member 16 so as to ensure that the small diameter end 18 will not become wedged against shoulder 24 when the spring member is compressed into the outside recess 14 during insertion of the pipe. In this instance, as shown in FIGURE 4, the axial distance between shoulders 22 and 24 is greater than the axial distance between the large diametered end 17 and the free ends 27 of the tabs 23. The clearance between shoulder 24 and end 18 is best shown in FIGURE 3.

Preferably the coupler member 12 is formed to surround a pair of coaxially contiguous pipes 11 and 31 in a telescopic assembly wherein the two pipes 11 and 31 are inserted into the opposite ends 32 and 33 of sleeve 12 up to and into abutment with an internal protrusion 34 formed in the sleeve immediately of its length. As will be observed from FIGURE 1 recess 14 is formed in coupler member 12 between protrusion 34 and end 32; and a second internal annular recess 36 is similarly formed in member 12 between protrusion 34 and end 33. Similarly pipe 31 is formed with an external annular recess 37 which on full insertion of pipe 31 will move into registration with recess 36; and a frusto-conical snap-ring member 38 formed identically to member 16 is positioned in recess 36 for locking pipe 31 when the latter is fully inserted into the coupling sleeve 12 in the same manner as above described. In other words the joint of the present invention may be provided in a pair of telescopically engaged pipe sections or by a separate coupler sleeve arranged to join coaxially contiguous pipes.

With reference to FIGURE 1 it will be noted that sleeve 12 is formed adjacent its opposite ends and between such ends and recesses 14 and 36 with internal substantially cylindrical portions 41 and 42; and the sleeve is formed with frusto-conical tapered portions 43 and 44 of gradually decreasing diameter extending from recesses 14 and 36 to protrusion 34. Pipes 11 and 31 are of substantially cylindrical form of outside diameter having a sliding fit within the sleeve cylindrical portions 41 and 42 and a compressive fit with the frusto-conical portions 43 and 44. It is a feature of the present construction that by making the sleeve 12 and pipes 11 and 31 from a substantially rigid thermo-plastic material composed primarily of polyolefin that a cold flow expansion of the sleeve and contraction of the pipes takes place in the telescoping together of the assembly so as to provide a closely mated engagement between the pipes and the sleeve. Preferably the ends 32 and 33 are flared outwardly as illustrated in FIGURE 1 so as to facilitate the insertion of the pipes 11 and 31.

Preferably, the several recesses 13, 14, 36, and 37 are formed in the pipe and coupler members by deforming the wall of such members without substantially reducing the cross-sectional thickness of the wall. Such deformation can be effected in suitable dies which in the case of sleeve 12 form external annular shoulders 46 and 47 around recesses 14 and 36; and in the case of pipes 11 and 31 form internal annular shoulders 48 and 49 around recesses 13 and 37.

Of the polyolefin family polyethylene and polypropylene are both available commercially and may be used either individually or in combination and with various fillers or modifiers which may be added as is well known in the art. The end material should, however, be primarily a polyolefin, that is a compound in which the polyolefin content is at least 50 percent. The particular thermoplastic selected should have a modulous of elasticity in the range of about 50,000 to about 250,000, a tensile strength at yield in the range of about 2,500 to about 7,000 p.s.i., a stiffness in flexure in the range of about 5,000 to about 200,000 and an elongation in the range of about 5 percent to about 100 percent. The expansion and contraction of the interengaged coupler and pipe sections will ordinarily be in the order of at least one (1%) percent. Thus an effective seal between the pipe and coupling members may be maintained by the spilt ring member and the positive locking force of the latter can be used to overcome thermal contraction in the pipe joint by continually resisting disengagement of the pipe member from the coupling. For example, a pipe coupling structure according to the present structure using 2½ inch propylene pipes joined in a propylene coupler sleeve withstood 1600 pounds of axial pull before starting to fail, and at which time the pipe and not the connector began to fail. Preferably, the split ring member 16 is made out of acetel, although it could be made out of other material which should be preferably stronger than the pipe material. Acetel is sold under the trade names of Delrin and Celcon by E. I. du Pont de Nemours & Co., of Wilmington, Del., and Celanese Corporation of America of New York City and Newark, N.J. Acetel is derived from phenol but is a thermo-plastic material and is an industrial material which is somewhat harder, higher temperature resistant and of higher tensile strength than the normal thermo-plastic materials.

The same principle of this invention can be applied by allowing the male pipe member to carry the frusto-conical ring member rather than the female pipe member during insertion of the male pipe member into the female member. This is illustrated in FIGURES 5 and 6 wherein the elements which are the same as in the previous figures are designated by the same reference numeral, only with an $a$ affixed thereto.

The frusto-conical member 16a is of segmental shape and is of spring material and has a circumferential dimension greater than a semi-circle but less than 360° and is of a dimension to be self-retaining when mounted in recess 13a in the male pipe member 11a. The resilient ring 16a is frusto-conical and has a plurality of circumferentially spaced resilient tabs 27a projecting in a general direction inwardly toward the axis of the ring 16a and away from the small diametered end. The free end of the tabs 27a are circumscribed about the axis of the ring 16a on an arc of a radius which is substantially equal to the radius of the smaller diametered end 52. Preferably the free end of tabs 27a extend axially beyond the large diametered end 54 of the frusto-conical member 16 so as to ensure that the end 54 will not become wedged against shoulder 56 when the spring member is compressed. The free ends of the tab 27a are arranged to abut the shoulder 56 at one end of the recess 13a; the small diametered end 52 of the ring 16a is arranged to abut the shoulder 21a at the other end of the recess 13a; and the large diametered end 54 is disposed for abutment with the shoulder 22a at one end of the recess 14a on the female coupler member 12a. The tabs and frusto-conical portion are sufficiently resilient to permit the large diametered end to be displaced entirely into the recess 13a upon telescopic insertion of the male pipe section 11a into the female section 12a, as shown in FIGURE 5, and to effect automatic spring back of the large diametered end 54 into the recess 14a when the end 54 registers with the recess 14a, as shown in FIGURE 6.

Figure 5:
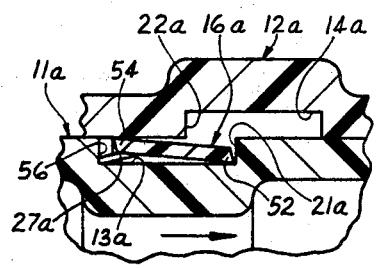
FIGURE 5 is an enlarged fragmentary cross-sectional view of a modified embodiment of FIGURE 1 illustrating the coupler and pipe section with the pipe section partially inserted.
Figure 6:
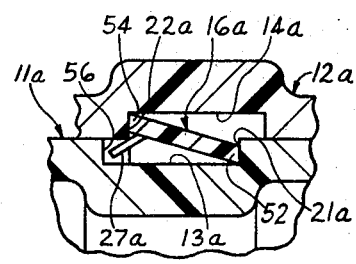
FIGURE 6 is an enlarged fragmentary cross-sectional view of the embodiment of FIGURE 4 only with the pipe section fully inserted.

The tab 27a and the small diametered end 52 abut their respective shoulders to maintain the ring 16a in recess 13a during telescopic assembly of the pipes, as shown in FIGURE 5, and the large diametered end 54 and small diametered end 52 engage their respective shoulders to prevent withdrawal of the section 11a from section 12a, as shown in FIGURE 6.

The pipe 11a, coupler 12a, and the ring 16a can be made of the same materials as set forth above for pipe 11, coupler 12, and ring 16.

We claim:
1. A joint connection between adjacent ends of a male member and a female tubular member comprising: An annular recess in the inner wall of said female mem- ber, an annular recess in the outer wall of said male member, said adjacent end of said male member being received within said adjacent end of said female member, said first named recess being defined by first and second axially spaced opposed shoulder means extending transversely to the longitudinal axis of said female member, said first shoulder means being closer to said adjacent end of said female member than said second shoulder means, said recess on said male member terminating at annular shoulder means at one axial end thereof extending transversely to the longitudinal axis of said male member and facing in a direction away from said adjacent end of said male member, a split annular resilient member having a circumferential dimension greater than a semi-circle but less than 360°, said resilient member comprising a main frusto-conical shaped body portion having its large diametered end disposed in said first named recess for engagement with said first shoulder means and its small diametered end disposed for engagement with said shoulder means on said male member, said resilient member further comprising a plurality of resilient tabs at the small diametered end thereof extending in a general direction away from both the axis of said resilient member and said large diametered end, said tabs being disposed for engagement at the free end thereof with said second shoulder means, said resilient split ring being so constructed and arranged relative to said first named recess that said large diametered end and said tabs are located in said first named recess and said small diametered end is located outside of said first named recess prior to insertion of said male member into said female member and the small diametered end can be displaced entirely into said first named recess by said male member during insertion thereof into said female member until said second named recess registers with said small diametered end whereupon said small diametered end moves out of said first named recess for engagement with said shoulder means on said male member, whereby said resilient member is held in said first named recess during insertion of said male member into said female member by engagement of said tabs with said second shoulder means and said resilient member prevents said male member from being withdrawn from said female member after insertion therein by engagement of said large and small diametered ends of said frusto-conical body with their respective shoulder means.

2. The structure as recited in claim 1 wherein said tabs extend axially beyond said small diametered end, the axial distance between said first and second shoulder means being greater than the axial distance between said large diametered end and said free end of said tabs when said resilient member is in its position prior to insertion of said male member into said female member and after said small diametered end registers with the recess on said male member.

3. The structure as recited in claim 2 wherein the free ends of said tabs are located on an arc circumscribed about the same axis as said frusto-conical shaped portion and on substantially the same radius as said large diametered end.

4. The structure as recited in claim 3 wherein said resilient member is of acetal resin and said male and female members are a polyolefin.

5. A joint connection between adjacent ends of a male member and a female tubular member comprising: An annular recess in the inner wall of said female member, an annular recess in the outer wall of said male member, said adjacent end of said male member being received within said adjacent end of said female member, said second named recess being defined by first and second axially spaced opposed shoulder means extending transversely to the longitudinal axis of said male member, said first shoulder means being closer to said adjacent end of said male member than said second shoulder means, said recess on said female member terminating at annular shoulder means at one axial end thereof extending transversely to the longitudinal axis of said female member and facing in a direction away from said adjacent end of said female member, a split annular resilient member having a circumferential dimension greater than a semi-circle but less than 360°, said resilient member comprising a main frusto-conical shaped body portion having its small diametered end disposed in said second named recess for engagement with said first shoulder means and its large diametered end disposed for engagement with said shoulder means on said female member, said resilient member further comprising a plurality of resilient tabs at the large diametered end thereof extending in a general direction toward the axis of said resilient member and away from said small diametered end, said tabs being disposed for engagement at the free end thereof with said second shoulder means, said resilient split ring being so constructed and arranged relative to said second named recess that said small diametered end and said tabs are located in said second named recess and said large diametered end is located outside of said second named recess prior to insertion of said male member into said female member and the large diametered end can be displaced entirely into said second named recess by said female member during insertion thereinto of said male member until said first named recess registers with said large diametered end whereupon said large diametered end moves out of said second named recess for engagement with said shoulder means on said female member, whereby said resilient member is held in said second named recess during insertion of said male member into said female member by engagement of said tabs with said second shoulder means and said resilient member prevents said male member from being withdrawn from said female member after insertion therein by engagement of said large and small diametered ends of said frusto-conical body with their respective shoulder means.

6. The structure as recited in claim 5 wherein said tabs extend axially beyond said large diametered end, the axial distance between said first and second shoulder means being greater than the axial distance between said small diametered end and said free end of said tabs when said resilient member is in its position prior to insertion of said male member into said female member and after said large diametered end registers with the recess on said female member.

7. The structure as recited in claim 6 wherein the free ends of said tabs are located on an arc circumscribed about the same axis as said frusto-conical shaped portion and on substantially the same radius as said small diametered end.

8. The structure as recited in claim 7 wherein said resilient member is of acetal resin and said male and female members are a polyolefin.

References Cited

UNITED STATES PATENTS

| | | | |
|---|---|---|---|
| 1,587,079 | 6/1926 | Machino | 285—104 |
| 2,147,353 | 2/1939 | Scholtes | 285—340 |
| 2,744,769 | 5/1956 | Roeder et al. | 85—8.8 |
| 3,193,309 | 7/1965 | Morris | 285—321 |
| 3,272,538 | 9/1966 | Bergstrom | 285—321 |

FOREIGN PATENTS 695,250    9/1964    Canada.

CARL W. TOMLIN, *Primary Examiner.*

W. L. SHEDD, *Assistant Examiner.*